United States Patent [19]

Schramer

[11] Patent Number: 5,040,903
[45] Date of Patent: Aug. 20, 1991

[54] RECLOSABLE FLEXIBLE CONTAINER AND METHOD OF RECLOSING

[75] Inventor: Kurt M. Schramer, Stow, Ohio

[73] Assignee: Morgan Adhesives Company, Stow, Ohio

[21] Appl. No.: 413,951

[22] Filed: Sep. 28, 1989

[51] Int. Cl.$^5$ .......................................... B65D 33/18
[52] U.S. Cl. ...................................... 383/70; 383/71; 383/89; 206/813
[58] Field of Search ............ 383/62, 70, 71, 82, 383/86, 89, 59, 66, 78, 81, 83; 206/607, 620, 621, 621.7, 630, 631, 631.1, 632, 633

[56] References Cited

U.S. PATENT DOCUMENTS

| | | | |
|---|---|---|---|
| 2,036,687 | 4/1936 | Fisher | 383/70 |
| 2,974,321 | 3/1961 | Salka | 383/70 X |
| 3,184,149 | 5/1965 | Repko | 383/89 X |
| 3,279,331 | 10/1966 | Platt | 383/86 X |
| 3,334,805 | 8/1967 | Halbach | 383/70 |
| 3,417,912 | 12/1968 | Paxton | 383/62 X |
| 3,504,475 | 4/1970 | Dickard et al. | 383/89 X |
| 3,806,024 | 4/1974 | Marchesani | 383/62 |
| 4,008,851 | 2/1977 | Hirsch | 383/71 X |
| 4,408,643 | 10/1983 | Laske et al. | 383/70 |
| 4,543,139 | 9/1985 | Freedman et al. | 383/86 X |
| 4,584,201 | 4/1986 | Boston | 383/89 X |
| 4,871,265 | 10/1989 | Peck | 383/89 |
| 4,911,563 | 3/1990 | Ciani | 206/813 X |

FOREIGN PATENT DOCUMENTS

| | | | |
|---|---|---|---|
| 2575728 | 7/1986 | France | 383/70 |
| 1088414 | 10/1967 | United Kingdom | 383/70 |
| 2173770 | 10/1986 | United Kingdom | 383/71 |

Primary Examiner—Stephen Marcus
Assistant Examiner—Jes F. Pascua
Attorney, Agent, or Firm—Oldham & Oldham Co.

[57] ABSTRACT

The invention disclosed provides a flexible container which may be reclosed using a reusable closure system. The reusable closure system is an adhesive strip affixed to the flexible container which allows the flexible container to be reclosed a multiple number of times. The preferred method of closing the container comprises about any product contained therein between the open end of the container to substantially close the container. The gathered portion is then twisted and open end of the container is folded about the gathered portion and secured to any site on the container by means of the adhesive strip. A pressure sensitive adhesive utilized in conjunction with the strip quick-tack and quick-peel characteristics and does not permanently adhere to itself. The strip is usable over a broad range of temperatures and enables reclosing of a variety of containers both easily and effectively.

21 Claims, 2 Drawing Sheets

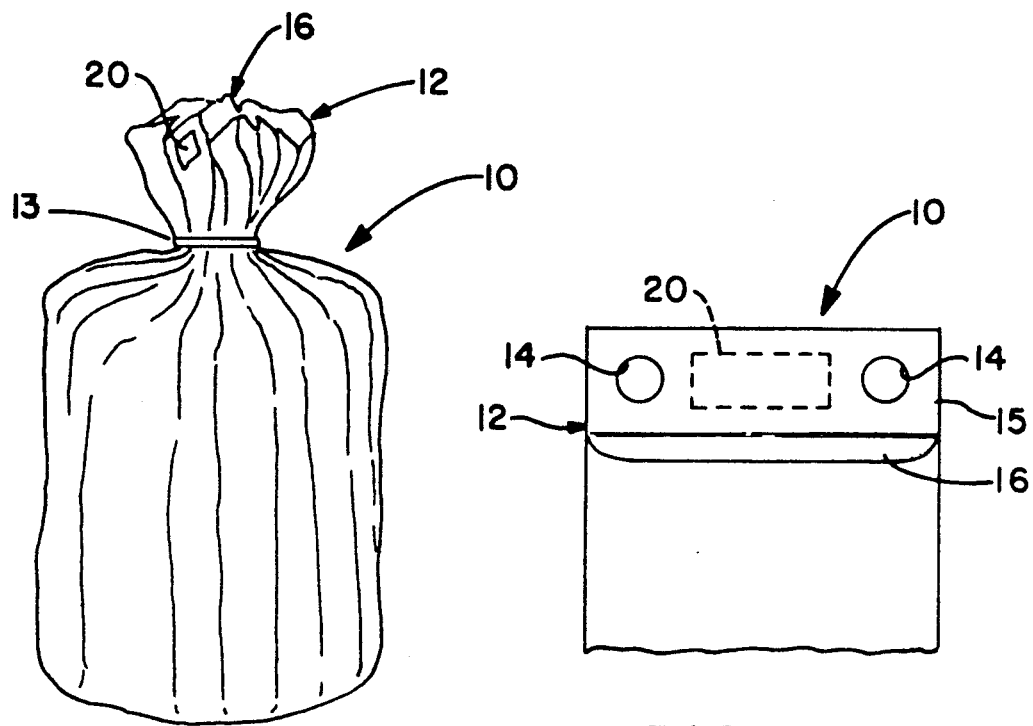
FIG.-1
FIG.-2
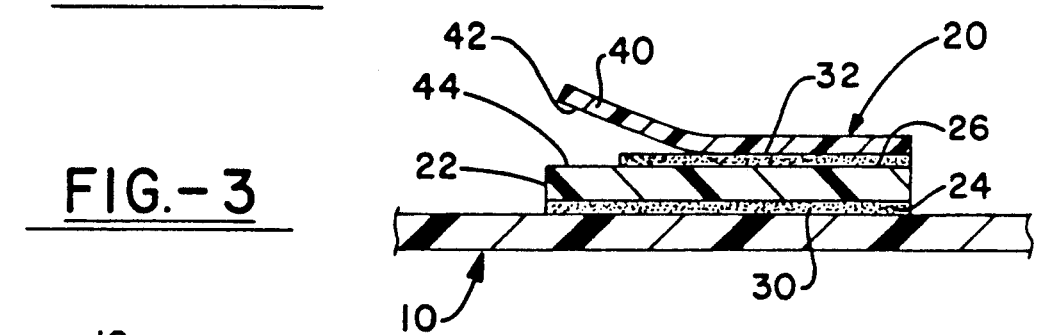
FIG.-3
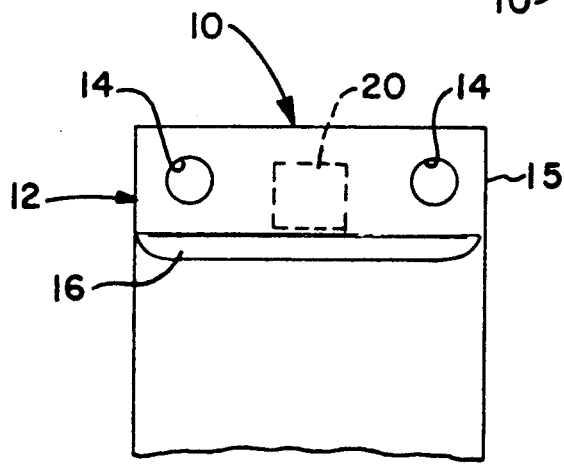
FIG.-4
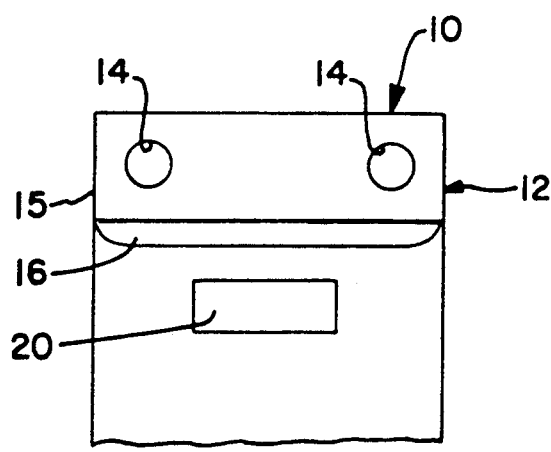
FIG.-5

RECLOSABLE FLEXIBLE CONTAINER AND METHOD OF RECLOSING

TECHNICAL FIELD

The present invention relates to a flexible container which may be reclosed using a reusable closure system. More specifically, this invention relates to a flexible container having an adhesive strip thereon enabling an open end of the container to be twisted to substantially close the open end and to be secured to maintain closure of the container using the strip. The strip may be used multiple times to close the container and allows easy and effective closure of such flexible containers. The method of reclosing a flexible container is also set forth.

BACKGROUND OF THE INVENTION

There is known in general in the prior art a number of methods for protecting the contents of a flexible container through the use of a reusable closure. One of the most widely used methods for resealing or reclosing flexible containers involves the use of a separate component such as a twist tie or plastic clip. These methods, however, have several disadvantages due to the fact that the reusable seals are not part of the container. The plastic clips or twist ties may often be misplaced between uses and also require some degree of fine motor control, therefore making their use difficult for the young, the elderly and the physically handicapped to use. Additionally after repeated use, plastic clips often break and the twist ties expose their sharp metal wire support making their use hazardous. These closures may also pose a risk of choking or other hazards for small children who may have access to them. These types of closures can also cause tears in the flexible containers.

Another known construction utilizes Ziploc ® and similar zipper-like sealing means to provide the containers with a reusable air tight seal. This construction adds substantially to the cost of the container and adds difficulty to its manufacture. Furthermore, these systems also require some fine motor control which may prove difficult for some user populations.

Previous attempts at developing reusable sealing means involving pressure sensitive adhesive were largely unsuccessful or unnecessarily complex. Many resealable systems were unreliable in that after a limited number of reclosures the seal would often fail to further adhere. Other systems require components which had to be manufactured using methods of die cutting or other off line processes thereby prohibitively raising the cost of such systems.

One example of a reclosing system is shown in U.S. Pat. No 4,552,269, which discloses a resealable device consisting of a paper or foil blank and a sealing flap. While this is an improvement over prior resealable devices, this device still requires production through die cutting means and provides only a limited size opening which can be resealed. Another system is shown in U.S. Pat. No. 4,584,201 which shows use of an adhesive strip positioned parallel to a top sealed edge of a container. The top edge can be folded upon itself and then adhered to the strip for a particular specific type of container.

SUMMARY OF THE INVENTION

Therefore, it is an object of the present invention to provide an inexpensive means and method for closing a flexible container.

It is also an object to provide a means for closing a flexible container which is reliable and can easily be used a multiple number of times before failing to seal.

It is also an object to provide a means and method for closing a container which can be used or adapted for use on a large number of different containers It is also an object to provide a means and method for closing a flexible container such that the adhesive will maintain a closure when placed on a plurality of spots on the flexible container.

It is a further object of this invention to provide a means and method for closing a container which is simple to use and requires a minimal amount of motor control or consumer education.

It is a further object of this invention to provide means and method for closing a container wherein the invention can be attached to the flexible containers as a part of an in-line manufacturing of the flexible container or the in-line packaging of the product.

These and other objects may be accomplished with the present invention which comprises a flexible container for holding a product, having at least one open end. The container includes a reclosing strip having first and second surfaces which is positioned on the container. At least a portion of the first surface contacts and bonds with the container with a first adhesion strength and at least a portion of one of the first or second surfaces having a pressure sensitive adhesive disposed thereon having a second adhesion strength less than the first adhesion strength. A release liner is positioned on the pressure sensitive adhesive to protect the adhesive until use of said reclosing strip is desired. The reclosing strip is usable by removal of the release liner to expose the pressure sensitive adhesive layer enabling the open end of the container to be closed by folding of the open end to be temporarily secured to the container by means of the strip.

The strip may be a film having a size sufficient to maintain a seal to the container when used a multiple number of times. One surface may be layered with an adhesive of sufficient strength so as to bond permanently to the container or may be heat sealed therewith. A second surface of the strip is layered with non-permanent adhesive capable of repeatedly bonding to a mounting surface. The bonding of the first surface should always have a strength which is greater than the adhesive strength of the non-permanent adhesive so as to remain bonded to the flexible container during the repeated resealing of the strip with a mounting surface.

In order to permit easy removal of the release liner from the adhesive strip, an adhesive free area should be located beneath the liner along an outer edge to provide a lift tab. Alternatively, the release liner could be dimensioned so as to provide a lift tab.

Generally, the container to which the strip will be applied is a flexible bag, often a wicket bag. The bag has one open end with an excess portion or "ponytail" extending beyond any product or the like at the open end of the bag. The strip may be applied to the outer surface of the ponytail such that the surface having the non-permanent adhesive is exposed outwardly. The non-permanent adhesive does not contact the bag initially, and is protected by the release liner.

The strip may be used as an initial closure for the flexible container or conventional means such as a twist tie or plastic clip or may be used to initially close the container. If a conventional initial closure means is utilized, this may first be released, after which the non-permanent adhesive strip may be activated by removing the release liner. The bag may be sealed by folding the ponytail containing the adhesive strip over the opening and affixing it to a site on the flexible container. However, the preferred method comprises gathering and twisting the container about a product contained therein before applying the non-permanent closure so as to effectively close the container before the strip is used. The strip then enables the ponytail of the container to be secured to a site on the container to maintain the closed condition and retain the freshness of its contents.

The non-permanent adhesive is designed to provide a secure closure which can be adhered anywhere on the container and can be reused multiple times. Furthermore, the non-permanent adhesive is designed to have instantaneous, pressure sensitive adhesive properties, but lacking sufficient adhesion to cause a tear in the container. Other advantageous properties of the non-permanent adhesive and container assembly are also set forth.

BRIEF DESCRIPTION OF THE DRAWINGS

The objects and advantages of the invention will become apparent from a reading of the following detailed description with reference being made to the accompanying drawings wherein;

FIG. 1 is a perspective view of a flexible container having the reusable closure system of the invention;

FIG. 2 is a partial top elevational view of one preferred embodiment of the flexible container with a reusable adhesive strip;

FIG. 3 is a cross sectional view of the reusable adhesive strip as affixed to a flexible container; and FIGS. 4-8 show partial top elevational views of alternate preferred embodiments of a flexible container with a reusable adhesive strip.

DETAILED DESCRIPTION OF THE PREFERRED EMBODIMENT

Figure 6:
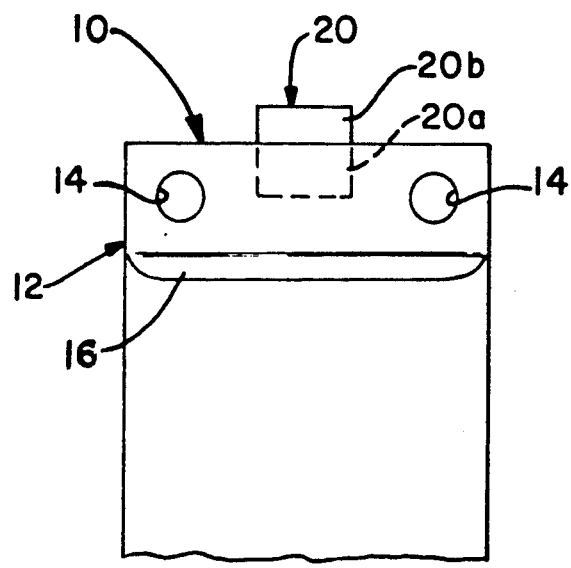

Referring now to the drawings, FIGS. 1 and 2 show a preferred embodiment of the present invention showing a flexible container 10 for holding a product therein. The container 10 is conventionally used for products such as breads, but may utilized to store a variety of products conveniently and inexpensively. The container 10 generally comprises an open end 16 and has an excess portion or ponytail 12 which is utilized to close the open end 16. In a conventional container of this type the ponytail may be gathered about the product contained therein at 13. The gathered portion 13 can be twisted to substantially close the open end 16 and then be maintained in the closed position by means of reusable closure system 20 affixed to the container 10, as will be hereinafter described.

The flexible container 10 is disclosed as a plastic bag, specifically a polyethylene wicket bag, which is well known in the art. It is however, contemplated that the reusable closure system 20 can be utilized on a variety of different flexible containers or bags. The wicket bag or container 10 generally includes wicket holes 14 which are utilized in subsequent processing methods. As seen in FIG. 2, the flexible container 10 with a ponytail 12, has an extending flap 15 having an inner surface and an outer surface. The closure system 20 is preferably positioned adjacent the open end of the container 10, and may be on the inner of outer surface of the flap 15 for example. The wicket holes 14 are apertures cut through the flap 15 which are located in a lateral relationship to one another. These wicket holes 14 are used in the bag making process and subsequent handling, such as during an automated in-line bag loading process. The ponytail 12 also comprises an area of excess bag material which is conventionally used to effect closure of the bag. The ponytail 12 can be grasped at the edge of any product in the bag to substantially close the bag.

Referring now to FIG. 3, the closure system 20 includes strips 22 of film or similar material which may be rectangularly shaped pieces of film having sufficient size to achieve a secure closure, even after multiple uses. Generally each strip of film 22 has a first surface 24 and a second surface 26 to which different adhesives may be applied. The reusable closure system 20 would likely be applied to the flexible container 10 during the manufacturing of such container. Strips of film 22 previously coated with the designated adhesives would be fed from a continuous tape, cut to size and placed on the flexible container 10 as a part of the container's in-line manufacturing process. Alternatively, the strips of film 22 can be converted and die cut off line and supplied as discontinuous "labels" on a continuous release liner.

The first surface 24, or any portion thereof, may be coated with a high energy adhesive 30 to form an essentially permanent bond with the container 10 or a variety of mounting surfaces. In the preferred embodiment this adhesive 30 is generally a rubber based adhesive although other types of adhesives could be substituted by those knowledgeable in the art. Alternatively, the reusable closure system 20 could be attached to the bag using a heat lamination or ultrasonic welding process, thereby creating a bond between the strip of film 22 and the bag. In any event, the bonding of the surface 24 to the container 10 will have a greater strength than any bond formed between the second surface 26 and any mounting surface.

The second surface 26 of the film 22 is coated with a low energy, non-permanent adhesive 32. This adhesive 32 is disclosed as an acrylic adhesive possessing qualities of quick and non-permanent adhesion, but other tYpes of adhesives are also contemplated. This adhesive 32 is designed to provide a non-permanent but secure closure even after multiple uses. Other properties of the non-permanent adhesive layer 32 lie in the ability to allow wrinkling of the strip 22 wherein the adhesive 32 will non-permanently adhere to itself after which it can be unwrinkled for reuse. The pressure sensitive adhesive 32 should also have aggressive adhesive characteristics initially after which the adhering characteristics quickly level off to prevent growth of the adhesion strength to form the non-permanent bond. The adhesive 32 thus should have excellent quick-tack and quick-peel characteristics to provide a easily used and effective system.

As seen in FIG. 3, to protect the non-permanent adhesive 32 until its initial use by the consumer the adhesive is covered with a release liner 40. The release liner is of a size and shape equal to or greater than the size and shape of the adhesive means 20. In one embodiment, the release liner 40 is slightly greater in length than the strip 22, such that a small area 42 of a release liner 40 extends beyond the outer edge of the strip 22 providing the user with a convenient "tab" for grasping of the release liner. Alternatively, the strip 22 can be left with an uncoated edge 44 so as not to adhere to the release liner 40 at this location to form the "tab".

The strength of the adhesives are important not only with respect to the reusable nature of the system but the reusable closure system 20 must be able to withstand the stress which occurs during the automated packaging process of the flexible container 10. The adhesive 30 on the first surface 24 of the film 22 must be sufficient to hold the strip in place throughout this process. The adhesive 32 on surface 26 is designed such that it has a tight bond with the release liner 40 which inhibits removal during manufacture but allows the user to easily remove the liner 40. The initial filling of the flexible container 10 and the attaching of the initial closing means (e.g. a twist tie or plastic clip), if utilized, are two critical points in the packaging process where the reusable closure system would undergo the most stress.

Furthermore, the adhesives 30 and 32 on strip 22 are designed to provide consistent adhesion in a broad range of temperatures. It is contemplated that many food items which are packaged in flexible containers of this type may be stored in the refrigerator or freezer. It is, therefore, desirable to provide a pressure sensitive adhesive which will function over these temperature ranges. For example, an acrylic based adhesive as previously described with reference to adhesive layer 32 should have characteristics to allow proper functioning at room and refrigerator temperatures. For applications where freezer temperatures will be encountered, a "softer" pressure sensitive adhesive may be necessary. Such an adhesive allows retention of the flexibility, quick-tack and quick-peel properties even at freezer temperatures. In such an application, it must also be considered that condensation will form on the container when removed from the freezer. A suitable adhesive having the above characteristics to function on cold and possibly moist surfaces may be a rubber or polyisobutylene based adhesive, or may be a suitably modified acrylic based adhesive. The glass transition temperature of the adhesive can be lowered to accommodate this function. The particular formulation of the adhesive layers of the invention are not critical as long as the desirable characteristics are obtained.

The reusable closure system 20 is preferably affixed to the area on the outer surface of the ponytail 12 bounded by the wicket holes 14 on either side and the top edge of the elongated flap 12 as shown in FIGS. 2 and 4. With such positioning it is also desirable to leave a suitable amount of space 46 between the top edge of the container and the system 20 for grasping by the user. This allows the user to grasp the edge of the container without contacting and contaminating the exposed adhesive layer of the system 20, to quickly and efficiently secure the ponytail 14 to a site on the container. In FIG. 2, the reusable closure system 20 is affixed such that the length of said reusable closure system 20 is parallel to the top edge of the ponytail 12. Another embodiment, illustrated in FIG. 4 discloses a reusable closure system 20 affixed in a position in which the length of reusable closure system 20 is perpendicular to the top edge of the ponytail 12. Alternatively, the reusable closure system could be affixed to a plurality of sites on the flexible container 10, one position being illustrated in FIG. 5.

Still another embodiment is illustrated in FIG. 6 whereby only a portion of the first surface 24 is coated with high energy adhesive 30. The reusable closure system 20 is affixed to flexible container 10 across the top edge of the ponytail 12 in such a manner as to essentially divide the reusable closure system 20 into two portions. One half of the first surface 24, 20a, is coated with adhesive 30 and affixed to flexible container 10 while no adhesive is applied to 20b, the second half of the first surface 24. The second surface 26 would be layered with adhesive 32 as in the previous embodiments. Alternatively, the portion 20b could be pattern coated with the non-permanent adhesive 32 while the portion 20a is coated with a permanent adhesive 30. In this configuration, no adhesive would be applied to the second surface 26 of the strip. Various other configurations are within the scope of the invention.

Figure 7:
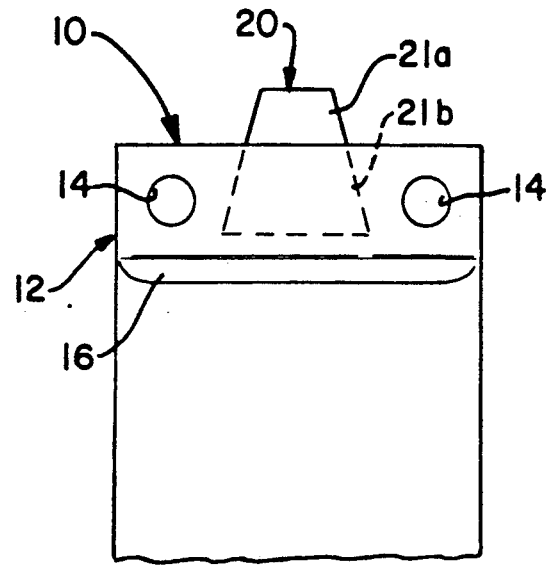
Figure 8:
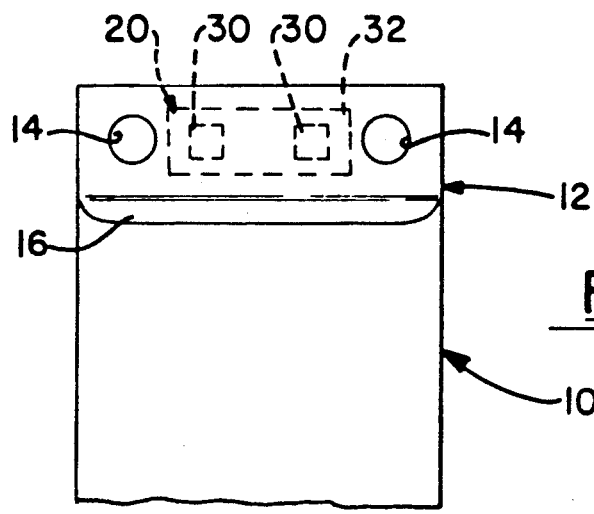

FIG. 7 further illustrates another embodiment whereby a non-permanent pressure sensitive adhesive is applied to the surface of the strip contacting the container. The surface area of 21a, being less than the surface area of 21b, results in surface 21a having a greater adhesive strength than 21b. This holds the reusable closure system 20 to the container 10 during repeated reclosures of the container 10 using surface 21b. While applying different adhesives to each surface for different adhesion characteristics is presently the preferred embodiment, the reusable closure system could work equally effectively using a single non-permanent pressure sensitive adhesive applied to both surfaces. In this embodiment, the reusable closure system would require the adhesive strength of the first surface 24 to be greater than the adhesive strength of the second surface 26. This differential adhesion could be accomplished by providing a first surface 24 with either a greater surface area of adhesive or a thicker coating of adhesive thereby forming a stronger bond than formed along the second surface of lesser adhesive or surface area as in FIG. 8 at 32.

In another aspect, it is desired to enable a user to more easily identify the location of the closure system on the bag. To accomplish this, the reusable closure system may be colored or coordinated in some manner with the graphic design of the flexible container 10. It is also possible to print on the release liner 40 to enable identification of the closure system 20.

After any initial closure means of flexible container 10 is opened, the reusable closure system 20 may be used subsequently to reclose said flexible container 10. The preferred method of reclosing the flexible container 10 using the adhesive means 20 is as follows:

First, remove the majority of air from the flexible container 10.

Second, grasping the flexible container 10 near the opening 16 turn the bottom portion of flexible container 10 and its contents at least one quarter turn or 90 degrees from its original position forming a "twist" in the container between the contents and the opening 16.

Third, remove the release liner 40 from the reusable closure system 20, thereby activating the repeatable nonpermanent adhesive 32.

Finally, seal the flexible container 10 by folding the ponytail 12 about the gathered portion 13 (as seen in FIG. 1), and securing the reusable closure system 20 to any spot on the container 10. The adhesive 32 is designed to provide a secure closure even after multiple uses but with such an adhesion that it does not cause the container 10 to tear.

Although the objects and advantages of the invention are achieved by the preferred embodiments of the invention as described, various modifications or changes will be recognized by those skilled in the art. The description of the preferred embodiments are therefore not intended to be construed as limiting the scope of the invention, which is only limited as set forth in the appended claims.

What is claimed is:

1. A reclosable flexible container having a reusable closure system comprising:
    a flexible container with a product therein, having an exterior surface and an excess portion at one end thereof relative to said product which may be gathered and twisted about said product;
    a securing means positioned on said exterior of an adjacent said one end of said container, said securing means having first and second surface with at least a portion of said first surface contacting and bonding said container with a first adhesion strength; at least one of said first and second surface having an adhesive layer disposed thereon with a second adhesion strength which is less than said first adhesion strength;
    said securing means positioned to temporarily secure said excess portion to another portion of said container by pulling taut and then folding said excess portion about said product after it has been gathered and twisted adjacent the product, and to maintain said excess portion in said gathered and twisted position by said securing means holding the excess portion in such taut, twisted, and folded position.

2. The reclosable flexible container of claim 1, wherein,
    said securing means comprises a strip and said adhesive layer is a pressure sensitive adhesive which enables said strip to be used a multiple number of times.

3. The reclosable flexible container of claim 2, wherein,
    said container includes an open end adjacent said excess portion and said strip is positioned adjacent said open end on said excess portion such that said open end can be substantially closed by said gathering and twisting of said excess portion and said excess portion can be secured to said container at any site thereon by means of said strip.

4. The reclosable flexible container of claim 2, wherein,
    said container includes an open end adjacent said excess portion and said strip is positioned on said container at a location away from said open end enabling said gathered and twisted excess portion to substantially close said open end and be secured to said container at the location of said strip.

5. The reclosable flexible container of claim 2, wherein,
    said strip is positioned to extend above said excess portion such that said first surface of said strip is partially affixed to the container.

6. The reclosable flexible container of claim 5, wherein,
    the portion of said strip which extends above said excess portion has a pressure sensitive layer disposed on said first surface with said second adhesion strength.

7. The reclosable flexible container of claim 2, wherein,
    said pressure sensitive adhesive is an acrylic base adhesive having aggressive initial adhesion characteristics after which growth of the adhesion strength is inhibited to form a non-permanent bond.

8. The reclosable flexible container of claim 2, wherein,
    said pressure sensitive adhesive provides consistent adhesion characteristics over a range of temperatures, so as to be usable at freezer or refrigerator temperatures as well as room temperature.

9. The reclosable flexible container of claim 1, wherein,
    said second surface has said pressure sensitive adhesive layer thereon.

10. The reclosable flexible container of claim 9, wherein,
    no layer of adhesive is applied to a portion of said first surface which is not in contact with said container.

11. The reclosable flexible container of claim 9, wherein,
    said adhesive on said first surface is said pressure sensitive adhesive disposed on said second surface but having a greater surface area than said second surface to form said first adhesion strength.

12. The reclosable flexible container of claim 1, wherein,
    said securing means is colored such that its position is easily recognizable for use, 13. The reclosable flexible container of claim 1, wherein,
    said first surface is heat sealed to said container to bond said securing means to said container with said first adhesion strength.

14. The reclosable flexible of claim 1, wherein,
    said adhesive on said first surface is a rubber base adhesive which forms a permanent bond with said container.

15. The reclosable flexible container of claim 1, wherein,
    said first surface includes a layer of adhesive on at least a portion thereof to bond said securing means to said container with said first adhesion strength.

16. The reclosable flexible container of claim 1, further comprising,
    a release liner positioned on said securing means and bonded therewith by a low-energy non-permanent bond, which acts to protect said securing means until securing of said excess portion to said container is desired.

17. A method of repeatedly closing a flexible container having at least one open end, comprising the step of:
    forming a flexible container having at least one open end and an excess portion adjacent said open end relative to a product to be disposed within said container;
    affixing a securing strip to the flexible container adjacent said open end, said strip having first and second surfaces with said first surface being bonded to said container such that said first surface is permanently affixed to said container, said second surface having a layer of nonpermanent adhesive disposed thereon for application to a mounting surface; a release liner dimensioned at least equal to said securing strip and contacting said second surface of said strip with a low energy adhesive bond;
    removing the release liner from said second surface of said adhesive strip, thereby activating the non-permanent reusable adhesive;
    substantially closing said open end of said container by gathering and twisting said excess portion of said container about a product disposed therein;

pulling said gathered and twisted excess portion taut and then folding said excess portion upon itself and attaching said open end to a site on said container by said securing strip to thereby hold the gathered and twisted excess portion in such taut, twisted and folded position to maintain the substantially closed position of said open end.

18. The method recited in claim 17 wherein said step of affixing said adhesive strip may be done at a plurality of sites on said container.

19. A method of closing a flexible container having contents therein comprising the step of:

forming said container so as to have a length of excess material at one end thereof relative to the contents within said container.

positioning a securing strip on said container adjacent said one end, said strip having first and second surfaces, wherein at least a portion of said first surface is permanently secured to said container and at least a portion of said second surface has a pressure sensitive adhesive layer thereon enabling selective non-permanent securing of said second surface to said container, gathering said excess material of said container between said one end and said contents of said container to form a gathered portion, twisting said gathered portion adjacent said contents, pulling said gathered portion taut and folding said excess portion of said container about the twisted gathered portion and securing said excess portion to said container by said securing strip to hold the excess portion in such taut, twisted and folded position.

20. A method of closing a flexible container as in claim 19, wherein, said reclosing strip is positioned adjacent said open end of said container such that upon folding of said open end about said gathered portion, said reclosing strip will enable securing of said open end to said container.

21. A method of closing a flexible container as in claim 19, wherein, said reclosing strip is positioned on a portion of said container away from said open end so as to enable securing of said open end to said reclosing strip upon folding of said open end about the gathered portion.

* * * * *